United States Patent
Raviv et al.

(10) Patent No.: US 8,166,198 B2
(45) Date of Patent: Apr. 24, 2012

(54) METHOD AND SYSTEM FOR ACCELERATING BROWSING SESSIONS

(75) Inventors: Gil Raviv, Kfar-Sada (IL); Giora Kosoi, Tel-Aviv (IL)

(73) Assignee: Flahs Networks, Ltd., Herzliya Petuach (IL)

( * ) Notice: Subject to any disclaimer, the term of this patent is extended or adjusted under 35 U.S.C. 154(b) by 949 days.

(21) Appl. No.: 11/686,495

(22) Filed: Mar. 15, 2007

(65) Prior Publication Data

US 2007/0233898 A1  Oct. 4, 2007

Related U.S. Application Data

(60) Provisional application No. 60/767,444, filed on Mar. 28, 2006.

(51) Int. Cl.
*G06F 15/16* (2006.01)
*G06F 15/173* (2006.01)

(52) U.S. Cl. .......................... 709/238; 709/217; 709/246

(58) Field of Classification Search .................. 709/217, 709/238, 248
See application file for complete search history.

(56) References Cited

U.S. PATENT DOCUMENTS

| | | | |
|---|---|---|---|
| 5,946,697 A | 8/1999 | Shen | |
| 6,249,844 B1 | 6/2001 | Schloss et al. | |
| 6,640,284 B1 | 10/2003 | Shaw et al. | |
| 6,654,766 B1 | 11/2003 | Degenaro et al. | |
| 2002/0147912 A1 | 10/2002 | Shmueli et al. | |
| 2003/0188021 A1 | 10/2003 | Challenger et al. | |
| 2004/0205149 A1* | 10/2004 | Dillon et al. | 709/217 |
| 2007/0198716 A1 | 8/2007 | Knowles et al. | |
| 2008/0072136 A1* | 3/2008 | Lotenberg | 715/234 |

FOREIGN PATENT DOCUMENTS

| | | |
|---|---|---|
| WO | WO 01/20485 A2 | 3/2001 |
| WO | WO01/20485 A2 | 3/2001 |
| WO | WO2006127750 A1 | 11/2006 |
| WO | WO2006127876 A2 | 11/2006 |
| WO | WO2007008291 A1 | 1/2007 |

* cited by examiner

*Primary Examiner* — Quang N. Nguyen
*Assistant Examiner* — David X Yi
(74) *Attorney, Agent, or Firm* — Smith Risley Tempel Santos LLC; Gregory Scott Smith

(57) ABSTRACT

The delivery of web content over an IP based network is accelerated by utilizing an intermediate node to receive requests for ML files, analyze ML files and create multipart objects that compound two or more browser's objects referenced by browser's links in the original ML file. The ML file is modified by replacing browser's links with multipart URLs that represent the multipart objects. When a subsequent user requests the page, the modified ML page is sent to the user and the multipart objects are more quickly and efficiently loaded into the user's browser.

26 Claims, 5 Drawing Sheets

METHOD AND SYSTEM FOR ACCELERATING BROWSING SESSIONS

CROSS-REFERENCE TO RELATED APPLICATIONS

This patent application is a U.S. non-provisional application filed pursuant to Title 35, United States Code §100 et seq. and 37 C.F.R. Section 1.53(b) claiming priority under Title 35, United States Code §119(e) to United States Provisional Application for Patent having been assigned the Ser. No. 60/767,444 and filed on Mar. 28, 2006, which application is herein incorporated by reference.

BACKGROUND OF THE INVENTION

The present invention relates to the field of data communication and, more particularly, to a system and method for accelerating data communication to improve the performance of browsing web pages.

The Internet is an exceedingly popular medium for data communication between computers. The Internet is a hierarchy of many computer networks, all of which are interconnected by various types of server computers. Some of the servers interconnected through the Internet also provide database housing or storage of a plurality of web pages. These web pages may be retrieved by users, also referred to as surfers, operating computers that are connected to the Internet and running browser applications. Following are few exemplary browser applications such as but not limited to Openwave Systems Inc. or Opera Mobile Browser (a trademark of Opera Software ASA), Microsoft Internet Explorer (a trademark of Microsoft), Firefox Web Browser, etc. Many current web pages are defined by markup languages (ML) files, including but not limited to, languages such as HTML, XML, WML, SGML, HDML etc. HTML is an acronym for Hyper Text Markup Language, XML is an acronym for Extensible Markup Language and WML is an acronym for Wireless Markup Language. SGML is an acronym for Standardized General Markup Language. HDML is an acronym for Handheld Device Markup Language. It should be noted that the terms "HTML", "XML", "SGML", "HDML" and "WML" may be used interchangeably herein. Henceforth, the description of different embodiments of the present invention may use the term 'HTML' as a representative term for any of the various forms of markup languages unless specifically limited to a particular markup language.

A ML file contains various commands, instructions, data and references (links) that together, define the overall appearance of a web page once it is fetched and rendered using a browser or other similar application. Common HTML files may comprise information that is relevant to the web page, information such as but not limited to a style sheet, text, images, Java Scripts, links to a style sheet, links to Java Scripts, links to additional objects, links to other web pages, etc. A web page can be composed from a plurality of objects or segments of the web page that together comprises the web page. The objects can be distributed over a plurality of servers.

Usually, an HTML file comprises links to the above-described objects rather than the objects themselves. This technique is widely utilized, thus most HTML files only include basic text and links to style sheets, Java scripts, images, and other objects and not the style sheet or the object itself. A portion of the links are used automatically by the browser during parsing of the page—these links are referred as browser's links. For example, links to Java scripts, style sheets, and images can be browser's links. Other links are displayed to be selected by the surfer; those links are referred as surfer's links, for example, links to other web pages.

While surfing the World Wide Web (WWW), a surfer (a user), utilizing a browser equipped computer, may send an HTTP (Hyper Text Transfer Protocol) request to a web server. In response, the web server may send an HTML file that defines the requested web page. In the disclosure of different embodiments of the present invention, the term computer represents any type of data communication device including, but not limited to, a laptop computer, a PDA, a cellular unit, a notebook computer, a personal computer, etc. Upon receiving the HTML file, the browser begins parsing the HTML file. When a browser's link is found, the browser may stop or pause the parsing process, establish a new connection according to the browser's link or use an existing connection, wait to get the object, parse the object and accordingly, may continue parsing the HTML file. In some cases, for example, when the browser's links define a style sheet, then presenting of the text can be delayed until receiving the style sheet. Handling of the browser's links during the rendering or presentment of the web page has an effect on the flow and timing of the presentment, and has an impact on the experience of the surfer.

Furthermore, fetching the objects by the browser increases the load on the Internet and increases the time for fetching the page due to the overhead of setting new connections to the plurality of servers at which the objects are stored as well as the time that it takes to send the request and get the response. This problem is exacerbated when the connection of the surfer's computer is done over a narrow bandwidth link such as a cellular link or when the web-servers are overloaded.

There are some prior art methods that can be used to reduce the impact of fetching of a plurality of objects. Some of the methods convert an HTML file into another file format, such as a bitmap, for example, to be transmitted to a surfer. Another prior art method, which is disclosed in PCT application serial number PCT/IL 2005/001099 uses an intermediate device operating between a surfer who requested a web page and a content server that delivers the web page. The intermediate device receives a markup language file received from the content server and is directed to a requesting client device. The ML file is parsed and at least one browser's link is identified. Then, the a browser's object that is associated with the identified browser's link is fetched and placed into the ML file in place of the browser's link to create a modified markup language file that includes the objects instead of the browser's links. The modified markup language file is transferred to the requesting client device. This method improves the time to text and increases the user experience.

Although the above-described prior art methods improve the user's experience in surfing the web, they have some limitations. For example, the first mentioned prior art eliminates the benefit of using a common web page. For example, a user cannot copy a section of the converted web page and use it in his document. The other prior art method may delay the first response to the user since the objects have to be retrieved by the intermediate device and the modified ML file has to be constructed.

Therefore there is a need in the art for a system and a method for reducing the number of objects that a browser fetches during rendering a web page, with minimum side effect on the user. Such a system may reduce the download time of a web page, improve the time to text of the page and reduces the load over the net.

BRIEF SUMMARY OF THE INVENTION

Different embodiments of the present invention resolve the above-described needs in the art by using one or more compound objects, wherein each compound object comprises one or more objects of independent data types. An exemplary compound object can be a multipart object, an archive object such as a zip file, etc. A multipart object is a data object that consists of multiple objects of independent data types, such as but not limited to: images (jpeg files, gif files), JavaScript, Cascading Style Sheet Language files, etc. The multipart object enables sending multiple objects to the browser within a response to a single request. The multipart object eliminates the need to establish a plurality of connections to fetch the plurality of browser's objects and accelerates the presentation of a web page. More information on multipart objects can be found in RFC number 822 and/or RFC number 2557, each of which can be retrieved from IETF (Internet Engineering Task Force) site www.IETF.org. The content of these RFCs is incorporated herein by reference.

Exemplary embodiments of the present invention benefit from a statistical fact that a large number of browser's objects that are included in a common web page are public objects. A public object is an object that is not defined as a private object. Defining an object as a private object is a feature of the communications protocol HTTP 1.1. Usually an object that is marked as a private object is an object that is created for a certain session and for a certain user. According to the HTTP 1.1 protocol, a private object is not cacheable at any intermediate node between the source of the object and the user. The private object can be cached only at the user's computer. The source content server of a private object can save components of the private object but not the object as a completed entity. The private object can be reconstructed per each request of the same user. More information on private objects can be found in RFC 2616 at the web site of the IETF: www.IETF.org, the content of which is incorporated herein by reference. A large portion of the browser's objects in a common web page are public objects. Most of the images (jpeg files, gif files), JavaScript, Cascading Style Sheet Language files, etc. are public objects. Those files can be used by a plurality of users and in a plurality of sessions. Furthermore, public objects can be cached by an intermediate node.

Another statistical fact which is relevant to some embodiments of the present invention, is that a significant portion of the traffic over the Internet comprises popular pages that are requested by a plurality of users. Therefore, utilizing a common browsing process of a web page by a first requester to accelerate the browsing process of the same web page to a following plurality of requesters, can reduce the load over the network and improve the satisfaction of the plurality of the following requesters.

Different embodiments of the present invention solve the above-described needs by providing a system and method for improving a user's experience while surfing the Internet. An exemplary system can be installed at a service provider premises (SPP). The service provider can be a telecom carrier, such as but not limited to, a cellular service provider, a satellite communication service provider, a Public Switched Telephone Network (PSTN) carrier, an access network service provider, etc. Other exemplary embodiments of the present invention can be installed in an Internet Service Provider (ISP) premises, or at content provider premises, for example.

An exemplary embodiment of the present invention can be installed as an HTTP proxy server in a node along the path between the client and the web server. For example, an embodiment of the present invention can be installed at a service provider's premises in front of a border gateway or a border router to intercept the data communication traveling to and from the Internet. Exemplary embodiments of the present invention can be transparent to the user's device as well as to the content server.

An exemplary embodiment of the present invention may listen to the requests that are sent to the Internet and the responses to those requests. If a request is for fetching a web page, then a converting table can be searched for an entry that is associated with the web page. The search can be based on the URL of the web page, for example. A URL is an abbreviation of Uniform Resource Locator, the global address of documents and other resources on the World Wide Web. If an entry is not found, this is an indication that the request is for a new page or a one that has an expiration date that has been passed and that the relevant entry and cached data for that page have been released. In this situation, a "New Page" process can be initiated. During the New Page process, exemplary embodiments of the present invention may wait until receiving the response, an ML file, an HTML file for example. The ML file can be sent to the requester, as is. In parallel, a copy of the ML file can be parsed, a list of browser's links is created and the new page process may wait for incoming requests for objects that are associated with the browser's links of the list.

The converting table may have a plurality of entries with each such entry being associated with a URL. The URL can be a URL of a web page or of a browser's object, for example. Each entry will have a plurality of fields that are used for storing tracking information. Tracking information can include: the URL, expiration date of the relevant object, source IP address, the location of the relevant multipart object in the cache, etc. An exemplary converting table can be implemented by a data structure, for example.

The received requests to those browser's objects are transferred to their destination (content servers) and the responses to those requests are intercepted. A copy of each response is saved in the cache and the response is transferred as is to the user. In parallel, a copy of the response is parsed and a decision is made as to whether or not the object is a public object. An exemplary embodiment of the present invention may parse the response searching for a field in the header that defines whether the response is a private object. If the response is not a private object it is classified as a public object. Then the converting table is updated with the classification of the object as well as its location in the cache. Thus, the first user that requests a new page (one that does not exist in the cache of the system) does not receive the benefit from the above-described operations of the exemplary embodiment of the present invention.

Other exemplary embodiments of the present invention may use common caching criteria in order to determine whether an object is cacheable. Exemplary caching criteria are disclosed in RFCs that are relevant to caching servers, such as but not limited to RFC 2616.

After collecting the received public objects, one embodiment of the present invention may create a compound object, such as multipart object. Henceforth, the description of different embodiments may use the term 'multipart' as a representative term for any compound object. The multipart object can include the received public objects. This multipart object is given an expiration date (Time out). The expiration date will be the earliest expiration date among the ones that belong to the objects that make up the multipart object. Another exemplary embodiment of the present invention may create two or more multipart objects. Different criteria can be used to divide the public objects into two or more multipart objects. As a non-limiting example, the criteria may include but not be limited to the expiration date, size, object type, location of the public object in the web page, etc. Each one of the multipart objects may have a different expiration date. Each multipart object can be store in the cache and an entry, which is associated with the multipart object (MPO), is added to the converting table. The entry can include the location of the MPO in the cache, expiration date, list of objects, etc.

After storing the one or more multipart objects in the cache, the relevant entries in the converting table are updated. Each one of the public objects that is included in the multipart object is associated with the URL of the multipart object (the location of the multipart object in the cache). For example, an entry in the converting table that is associated with a public object can include a multipart URL (MURL). The MURL may represent the URL of the relevant multipart object in the cache, as well as the URL of the relevant public object. At this point in time, the new page process is terminated and the exemplary embodiment of the present invention is ready for the next request to the same web page.

In the situation that a requested web page was previously handled by an embodiment of present invention, then an entry that is associated with the requested web page (requested URL) can be found in the converting table. Then, the request is transferred to the Internet and the exemplary embodiment may wait for the response. Upon receiving the requested ML file, the converting table is searched for an entry that is associated with the source URL. If an entry is found, which indicates that this ML file has been processed before and one or more MPOs have been created and stored in the cache, then, a decision is made whether the requesting browser can handle multi part objects. If not, the received ML file is sent as is to the requester. If the requester browser can handle multi-part objects, then the ML file may be parsed and modified into a modified ML file (MML) on the fly. Per each browser's link an entry is searched in the converting table. If an entry is found and the entry includes an MURL, the original URL (in the ML file) is replaced with the MURL for creating the MML file. Otherwise, the URL remains as is. The MML is transferred toward the requester.

In an alternate exemplary embodiment of the present invention a first MML which was created based on a public ML file can be stored in the cache. In such embodiment the location in the cache of the MML can be written in the relevant entry in the converting table. The relevant entry can be the entry that is associated with the URL of the requested public ML file. Upon receiving a second request for the same original URL of the requested ML file, then the MML file can be retrieved from the cache and be sent to the user.

Yet in an alternate exemplary embodiment of the present invention an MPO may be created on-the-fly instead of being prepared and stored in the cache. In such embodiment the public objects are stored in the cache and a list of the public objects that compose a MPO is stored in the converting table. Upon receiving a request for an MPO based on the MURL the list of the objects are retrieved and the MPO is created and be sent to the requester.

An alternate exemplary embodiment of the present invention may serve also a first requester of a new page. If a first requester has a browser application that can process a multi-part ML file, such as Microsoft Internet Explorer for example, the alternate embodiment of the present invention can hold the received ML file; parse it; order relevant browser's links; and conduct the new page process. At the end of the new page process, a Modified ML (MML) file can be created and sent to the requester instead of the received ML file.

At the user's device, the browser parses the MML file and for each converted link (MURL) of which its associated MPO is not stored in the browser's cache, a request to the MURL is sent according to the converted link. A converted link (MURL) is a link that was modified during the new page process. A MURL can include information that is associated with the location of the appropriate multipart object in the cache of the exemplary embodiment, and information on the location of a current object (the object that will replace the link). Upon receiving the response with the multipart object, the multipart object is stored in the browser's cache, and is parsed by the browser. The relevant object is retrieved from the MPO and used by the browser as originally intended. The browser continues parsing the MML file. When the browser encounters a link to another public object having an MURL, which is associated with the same multipart object, the appropriate MPO is retrieved from the browser cache. The MPO is parsed and the appropriate object is retrieved by the browser from the MPO to be used by the browser. If the link is an MURL of another MPO, the browser may check its cache or send a request for the new MURL. When an unmodified link is found by the browser, a request is sent toward the link.

In another exemplary embodiment of the present invention a browser application can be adapted to parse an MPO into a plurality of objects. Each object can be stored in the cache of the browser according to the original URL of the object.

An exemplary embodiment of the present invention may have a timer process that searches the converting table looking for entries that have expired. When such an entry is found, the relevant one or more locations in the cache can be deleted, as well as the relevant one or more entries in the converting table. The first request for a web page that has been deleted from the cache and/or the converting table will result in initiating a new page process for this page to include fresh information in the cache.

Other objects, features, aspects and advantages of the present invention will become apparent upon reading the following detailed description of the embodiments with the accompanying drawings and appended claims.

DETAILED DESCRIPTION OF THE INVENTION

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
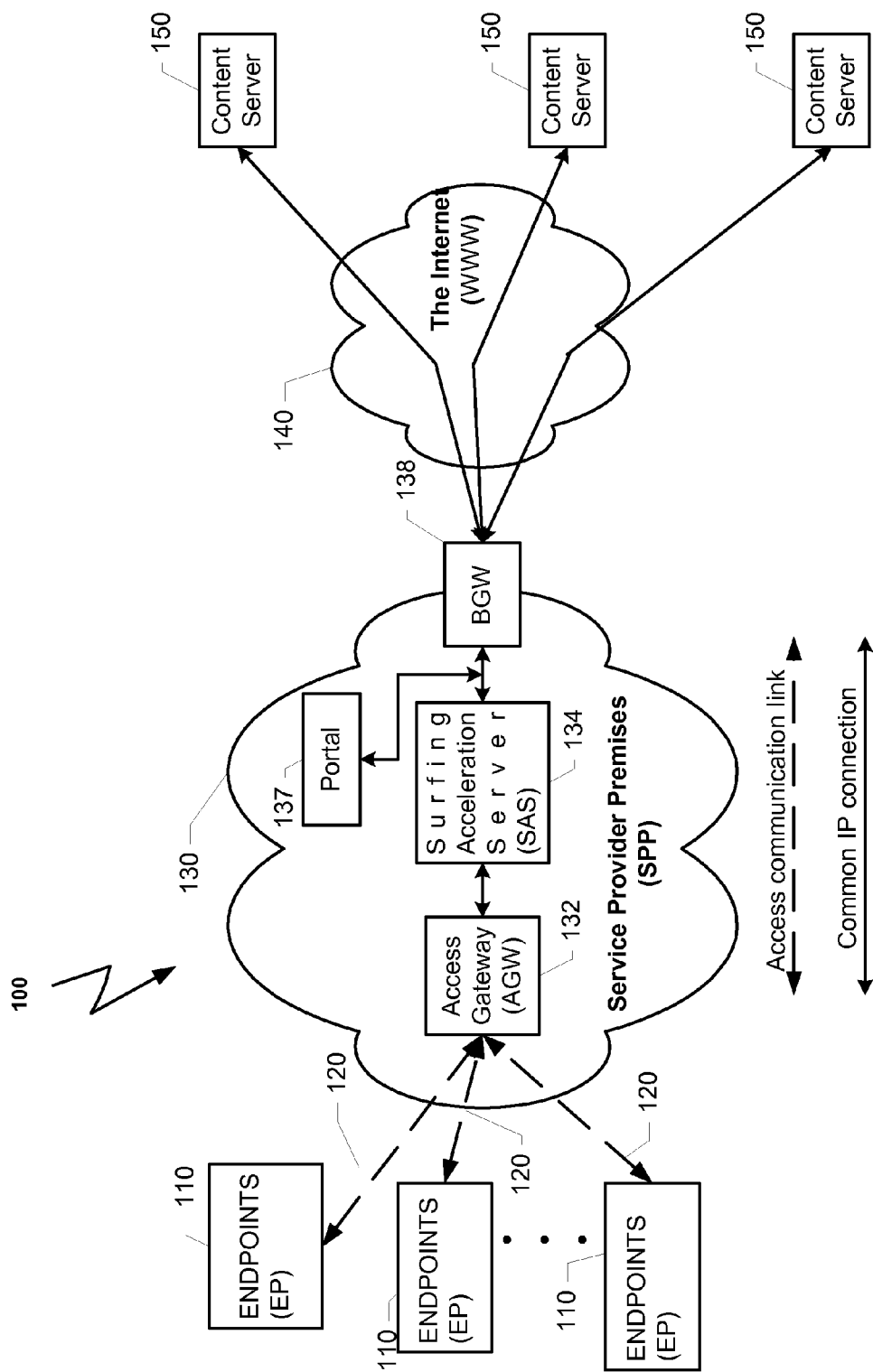
FIG. 1 illustrates a block diagram of an exemplary communication system that implements an exemplary embodiment of the present invention.

FIG. 1 depicts a block diagram with relevant elements of an exemplary communication system 100 that implements or incorporates an exemplary embodiment or aspects of the present invention. The communication system 100 has been selected as an exemplary environment that is suitable for implementing exemplary embodiments of the present invention. The communications system 100 may be a cellular data communication network, satellite networks, access networks, Internet Service Provider (ISP), or other type of network or communication system. Within the context of this description, the terms cellular, satellites, wireless, and ISP may be used interchangeably and at times, may have the same meaning.

System 100 may comprise one or more endpoints 110; a service provider premises (SPP) 130, a network 140 such as but not limited to the Internet, which can be referred also as the world wide web (WWW); and one or more Content Servers 150. An exemplary SPP 130, among other elements, may include an access gateway (AGW) 132, a Surfing Acceleration Server (SAS) 134 and a border gateway (BGW) 138. Furthermore SPP 130 may include a portal 137 of the service provider. In other embodiment portal 137 can be connected directly to network 140.

It will be appreciated by those skilled in the art that depending upon its configuration and the needs, system 100 may include more than three of Content Servers 150 and endpoints 110. However, for purposes of simplicity of understanding, three units of each are shown. It should be noted that the terms "content server", "web server" may be used interchangeably herein. Henceforth, the description of embodiments of the present invention may use the term 'server' as a representative term for a content server a web server or any other type of server that may be surfed by a user. It should be noted that the terms "endpoint", "endpoint computer", "client", "surfer", "user's device" and "user" may be used interchangeably herein.

System 100 is based on Internet Protocol (IP). It may represent one or more network segments, including but not limited to one or more Internet segments, one or more Intranets, etc. System 100 may run over one or more types of physical networks such as but not limited to Public Switched Telephone Network (PSTN), Integrated Services Digital Network (ISDN), Cellular network (G2, G3 & G3.5), satellite, etc., or even over a combination of two or more of these physical networks. System 100 may include intermediate nodes along the connection between a client and a content server. The intermediate nodes may include, but are not limited to, IP service provider servers, cellular service provider servers and other type of service provider equipment.

A plurality of endpoints 110 may be served by the System 100 and able to access the content servers 150 via the SPP 130 and the Internet 140. A common endpoint 110 may run a browser software application to surf the network and to communicate with one or more content servers 150. An exemplary browser application can be Internet Explorer (a trademark of Microsoft), for example. Exemplary endpoints 110 can be a personal computer (PC), a notebook computer, a cellular phone, handheld computer, a personal data assistant (PDA), or any other computing device with wire or wireless communication capabilities, etc.

The plurality of endpoints 110 are connected via data links 120 to the Access Gateway (AGW) 132 within the SPP 130. The connection between the endpoints 110 and the SPP 130 may be via intermediate nodes (such as a base station etc,) not shown in FIG. 1. The AGW 132 acts as an access gateway between the network protocol that is used over communication links 120 and the IP network that is used over the SPP 130. Exemplary AGW 132 may be a Remote Access Server (RAS), Gateway GPRS Support Node (GGSN), Packet Data Serving Node (PDSN), CDMA2000 Radio Access Network (RAN) or any other similar node.

Border Gateway (BGW) 138 is the interface between the Internet 140 and the SPP 130. BGW 130 may route the upload communication toward the appropriate destination over network 140. When the upload traffic is a request to a web page, the BGW 130 routes the request to the appropriate content server 150. The terms BGW and the Border Router may be used interchangeably throughout this description. In the download direction, the BGW 138 receives incoming packets from the different content servers 150 and distributes them to the appropriate modules of the SPP 130. Usually packets that are targeted toward an endpoint are transferred to the AGW 132.

An exemplary embodiment of the Surfing Acceleration Server (SAS) 134 can intercept traffic being communicated between the AGW 132 and the BGW 138 and receives all the packets that are flowing between the AGW 132 and the BGW 138. Therefore the SAS 134 receives the data traffic that is transferred between the plurality of endpoints 110 and the plurality of the content servers 150. In one exemplary embodiment, the SAS 134 may be configured as the default gateway for both sides of the SPP 130, (i.e., for AGW 132 and for the BGW 138). In another exemplary embodiment, the SAS 134 may physically reside between the AGW 132 and the BGW 138. In both cases, the SAS 134 may be transparent to both sides of the connection, to the endpoint 110 or to the content servers 150. In an alternate exemplary embodiment of the present invention, the SAS 134 may be used as a non-transparent HTTP proxy for example. In such a case, endpoints 110 can be configured to include the SAS 134 as their HTTP proxy, for example. In another exemplary embodiment of the present invention the SAS 134 can be configured as a transparent HTTP proxy. Such an embodiment may use redirection method.

Common data traffic between a user 110 and a content server 150 consist of a large number of connections. Each connection can carry one or more requests, which are followed by one or more responses. There are cases that the overhead, which is involved with each request/response and each packet, is larger than the content of the data of the object. An exemplary SAS 134 is adapted to intercept the traffic between the content servers 150 and the users 110, and to create one or more compound objects or multipart objects. Each compound object consists of two or more independent browser's objects. A browser's object is an object that is fetched automatically by a browser. The SAS 134 is further adapted to modify received ML files coming from the servers 150 to include links to those multipart objects instead of the originals links to the browser's objects that are contained within the relevant multipart object.

Consequently, the traffic between the users 110 and the content servers 150 is reshaped. The number of requests/responses is reduced from a need of submitting a request to support each object to a fewer number of requests according to the number of the compound objects (a multipart object, for example) that is compounded from a plurality of individual objects. The reshaping of the traffic is analogous to collecting a plurality of single passengers traveling in private cars into one bus or train. More information on the operation of SAS 134 is depicted below in conjunction with FIGS. 2-5.

Figure 2:
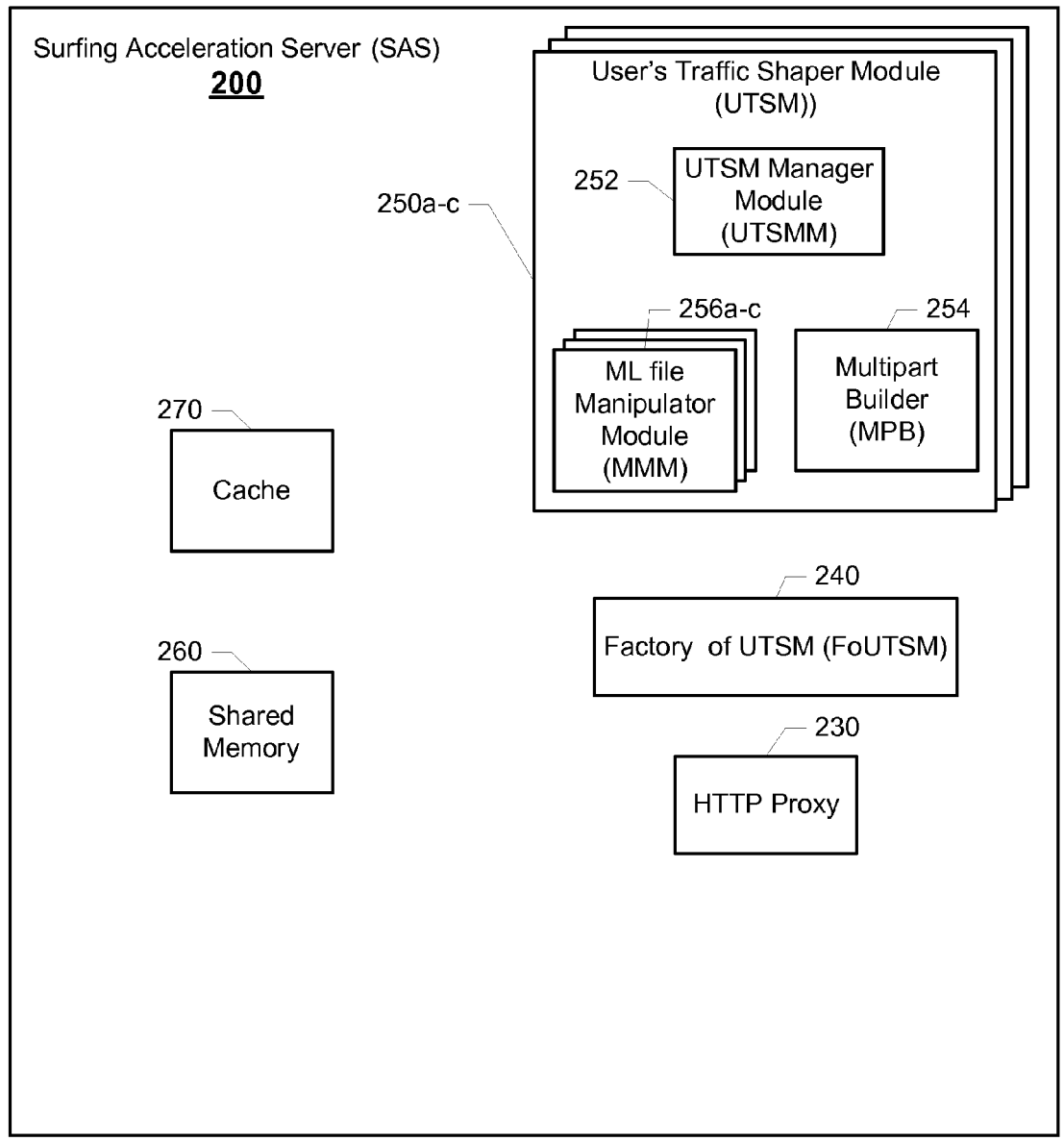
FIG. 2 illustrates a block diagram of relevant software modules of an exemplary embodiment of the present invention.

FIG. 2 is a block diagram illustrating relevant elements of a Surfing Acceleration Server (SAS) 200 that operates according to an exemplary embodiment of the present invention. The SAS 200 may be associated with an SPP 130 (FIG. 1) as an intermediate node between an AGW 132 and a BGW 138. Within the context of the Open System Interconnection (OSI) Reference Model seven layer communication stack, an exemplary SAS 200 can be implemented by a software module on top of an HTTP proxy.

In an exemplary embodiment of the present invention, the SAS 200 can be operative to shape the traffic between a plurality of surfers 110 (FIG. 1) and a plurality of content servers 150 (FIG. 1). In an exemplary embodiment of the present invention the SAS 200 can be configured as a proxy at the remote endpoints 110. In such an embodiment of the present invention, an exemplary SAS 200 may comprise an HTTP proxy 230, a Factory of User's Traffic Shaper Module (FoUTSM) 240, a plurality of User's Traffic Shaper Module (UTSM) 250*a-c*, one per each current user 110 that is communicating via the SAS 200, a shard memory (SM) 260 and a cache 270. It will be appreciated by those skilled in the art that depending upon its configuration and the needs, the SAS 200 may comprise more than three of UTSMs 250*a-c*. However, for purposes of the simplicity of understanding, three units of each are shown.

In an alternate exemplary embodiment of the present invention (not shown in the drawings), the operation of the SAS 200 can be transparent to the user. In such an example, a Redirector can be used. The Redirector collects packets coming from the plurality of endpoints 110 (FIG. 1) toward the plurality of the content servers (150) and redirects the packets to the SAS 200. In addition, the Redirector maintains the connections that were initiated by the users and takes care to handle IP address of packets going toward the users. An exemplary redirector can be a Content Inspection Director (CID) (a product of Radware Ltd, Israel).

The FoUTSM 240 is adapted to manage the operation of the SAS 200. As such, it can manage a converting table that is used for recording information on current activity of the entire SAS 200. The converting table may have a plurality of entries. Each entry will be associated with a link (URL). It can be a link to a web page or to a browser's object. Each entry will have a plurality of fields. Exemplary fields can be assigned to an expiration date of the object, source IP address, the location in the cache 270 of the relevant multipart object, etc. The converting table can be stored in shared memory 260. The FoUTSM 240 may have a timer application. The timer application can periodically search the converting table for expired entries (those that their expiration date has been expired); retrieve the location in the cache 270 that is relevant to those entries; and delete the cache's resources that have been allocated to objects that are associated to expired entries. Then, the timer application can delete the expired entries from the converting table.

Furthermore, the FoUTSM 240 can be adapted to receive packets coming from the plurality of users 110 via HTTP proxy 230, and to determine whether the packet was received from an existing user or a new user. This determination can be made based on a user table. A user table can include an entry per each existing user. An entry can comprise an identifier of the user and an associated UTSM 250 that has been assigned to that user. An exemplary identifier of the user can be the user's IP address. The associated UTSM 250 can be defined by an address of a queue in the shared memory 260 that has been allocated to the UTSM 250. The user's table can be used for routing data segments between the internal modules of the SAS 200. In an alternate exemplary embodiment of the present invention HTTP proxy 230 may be adapted to search the user's table for an entry that is relevant to the user. In this application the words "packet" and "data segment" can be used interchangeably.

If an entry is found in the user's table, then the received data segment is placed in the queue of the relevant UTSM 250. If an entry was not found, which means that the data segment was sent from a new user, then the FoUTSM 240 can create a new UTSM 250. In an embodiment in which the HTTP proxy 230 is adapted to search the user's table, if an entry is not found then the packet is transferred to the FoUTSM 240 for creating a new UTSM 250. Appropriate computing resources can be allocated to the new UTSM 250 as well as a queue in the shared memory 260 and a new entry in the user's table. The new entry includes the new user identifier, as well as the address of the queue of its associated UTSM 250. At the end of this process the data segment is placed in the queue of the new UTSM 250 and the FoUTSM 240 can handle the next packet coming from a user. When the connection with a user 110 is terminated, the FoUTSM 240 is adapted to verify that MMM 256*a-c* and MPB 254 have finished their task. If not USSM 252 may remain active as long as one of them is active. If yes, then UTSMM 252 can terminate the appropriate UTSM 250, to release the resources that have been allocated to this user and to delete the entry in the user's table that have been allocated to the user.

After its initiation by the FoUTSM 240, a UTSM 250 may perform the functionality that is needed for shaping the traffic between its associated user and the one or more content servers. The UTSM 250 communicates with its associated user and the current content server via the HTTP proxy 230. Among its tasks the UTSM 250 may create one or more compound objects, such as multipart objects (MPO), modify ML files to include links to multipart objects instead of browser's links to an object. An exemplary UTSM 250 may comprise a UTS manager module (UTSMM) 252, a multipart builder (MPB) 254 and one or more ML file manipulator module (MMM) 256*a-c*—one MMM 256 per each concurrent handled ML file. It will be appreciated by those skilled in the art that depending upon the needs, the UTSM 250 may comprise more than three of MMM 256*a-c*. However, for purposes of simplicity of understanding, three units of each are shown.

In case that a user opens several connections in parallel, the HTTP proxy 230 and the FoUTSM 240 are adapted to route the appropriate chunks of data to appropriate queues of the different modules of UTSM 250*a-c*.

The UTSMM 252 can be adapted to retrieve data segments from its associated queue in the shared memory 260. The data segments in the queue can be placed by the HTTP proxy 250 for a user who has an entry in the user's table or a data segment can be placed in the queue by the FoUTSM 240 for a new user. The retrieved data segment can be parsed by the UTSMM 252. If the data segment belongs to an ML file, the data segment can be transferred to a queue of the appropriate MMM 256*a-c* for further processing as described below in conjunction with FIG. 5. If the data segment is a request or an object, it can be processed by the UTSMM 252. In parallel, if the data segment belongs to an object, it will be stored in the cache 270. More information on the operation of the UTSMM 252 is disclosed below in conjunction with FIG. 3 and FIG. 4.

The MPB 254 is adapted to create one or more multipart objects. An exemplary MPB 254 may operate according to RFC 2557 and compounds two or more objects into a multipart object (MPO). The MPB 254 may receive a list of objects from the MMM 256, as it is depicted below in conjunction with FIG. 5. Then a decision is made on the number of MPOs to be created in order to replace a plurality of objects that are associated with an ML file. In an alternate exemplary embodiment, a plurality of objects may be organized in an MPO according to expiration date. In another exemplary embodiment, the objects can be selected according to their sizes in order to create a minimum number of packets. Yet an alternate exemplary embodiment of the present invention may use a combination of the above methods in order to select the objects that will be compounded into an MPO.

After defining the objects to be associated with each MPO, the objects are retrieved from the cache 270, based on the converting table, and then combined into the MPO. The one or more MPOs are saved in the cache and an entry is allocated in the converting table for each MPO. The entry can include the expiration data of the MPO, the location in the cache (the URL of the MPO), etc. Then an MURL value is defined per each browser's object that has been embedded within an MPO. The MURL may represent the location of the relevant MPO in the cache 270 as well as the original URL of the browser's object. An exemplary MURL may use Microsoft mhtml scheme. An exemplary MURL may be constructed as follows: mhtml:http://local_server/flashnetworks.mht!http://www.flashnetworks.com/images/1.gif. The MURL can be written in the appropriate field in the entry that is associated to the original URL.

At this point, the MPB 254 is ready to create another MPO. In an alternate exemplary embodiment of the present invention the task of the MPB 254 can be embedded in the task of the MMM 256 as it is disclosed in FIG. 5. Yet in an alternate embodiment of the present invention the MPB 254 can be located outside of the UTSMs 250 module that can serve two or more UTSM 250.

In an alternate exemplary embodiment of the present invention, in which an endpoint 110 includes a client application of the SAS 200, the MPB 254 may create a ZIP file as a compound object. The ZIP file may include two or more objects with their associated links and may be sent in response to a request for a URL in which the ZIP file is saved in the cache 270. The SAS client application at the endpoint 110 may be adapted to open the ZIP file and to store the two or more objects that were embedded in the ZIP file in the cache of the endpoint according to their associated links.

Yet alternate embodiment of the present invention may use a browser application, which is adapted to parse a compound object; to retrieve each one of the objects that are embedded within the compound object, and store each one of the objects in the browser's cache according to the URL of each object. In such an embodiment, an ML file may be modified to include one or more links to invisible objects. Each link will point to one of the compound objects. The links can be added at the beginning of the modified ML file. The URLs in the browser's links will remain without change and will not be modified to MURL.

The shared memory 260 is used as an interface between the different modules of the SAS 200 and for storing the converting table and the user's table. Each one of the modules may have a queue in the shared memory 260. Transferring information between the different modules can be done by placing a pointer to the information in a queue that is associated with the relevant module. The cache 270 can be a database, a persistence memory, or a cache proxy, for example, that stores information on the plurality of objects and MPOs. The information in the cache 270 is written by the UTSMs 250 and may be deleted by the timer application of FoUTSM 240 as mentioned above. Information on the location of the different objects in the cache can be stored in the converting table. In an alternate exemplary embodiment of the present invention cache 270 can be a commercial cache server or proxy that is associated with SAS 200.

Figure 3:
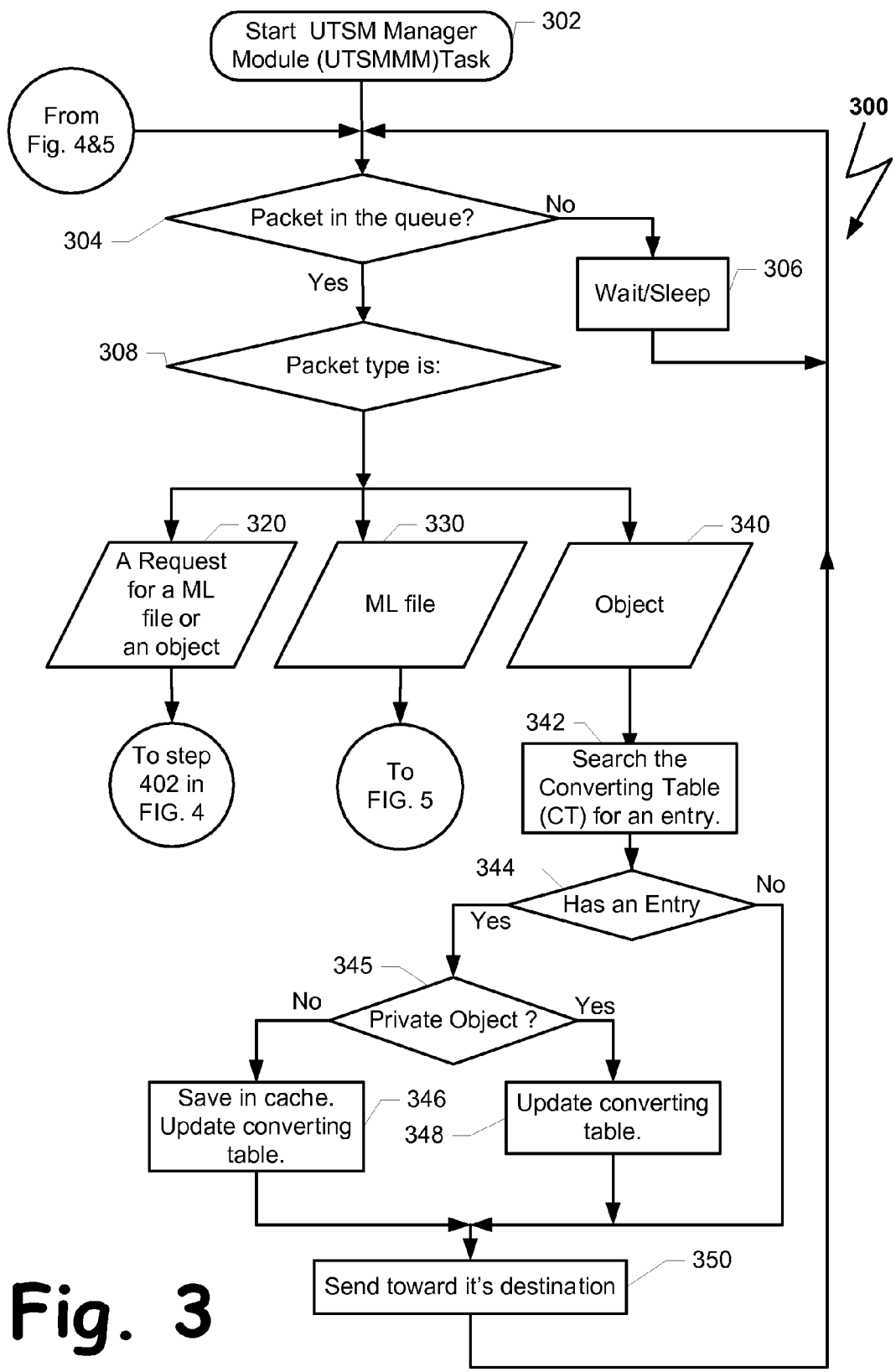
FIG. 3 illustrates a flowchart with relevant steps of an exemplary method that may be used by an exemplary UTS Manager Module (UTSMM).

FIG. 3 illustrates a flowchart with relevant steps of an exemplary process 300 that can be used for handling a received packet. The process 300 can be implemented by a UTS manager module (UTSMM) 252 (FIG. 2). The process 300 may be initiated 302 by the FoUTSM 240 (FIG. 2) upon receiving a request from a new user 110 (FIG. 1). It is initiated in association with or after creating a new UTSM 250 (FIG. 2) that will be associated with the new user. After initiation 302, the process 300 may run in a loop as long as the user 110 is active. During initiation 302, the UTSM 250 may get information on relevant resources, such as but not limited to its queues in the SM 260, any relevant entries in the user's table that are associated with the user, the location of the converting table, the locations of the queues of relevant modules, etc.

At step 304 & 306, the queue of the UTSM 250 (FIG. 2) is checked to determine if it contains a pointer to a next packet 304. If not, the process 300 waits for a period of time 306 and then returns to recheck the queue 304. However, if a pointer to a next packet is found in the queue, the process 300 retrieves the packet and may parse the header of the packet in order to define 308 the type of the packet. If 308 the packet is a request to a web page or to an object, the process 300 may initiate 320 a request processing task 400. Task 400 is described below in conjunction with FIG. 4. An alternate embodiment of the present invention may have a requester module as one of the modules of UTSM 250. In this situation, a request packet may be placed in the queue of the requester module. The requester module may perform a similar task to process 400.

Figure 5:
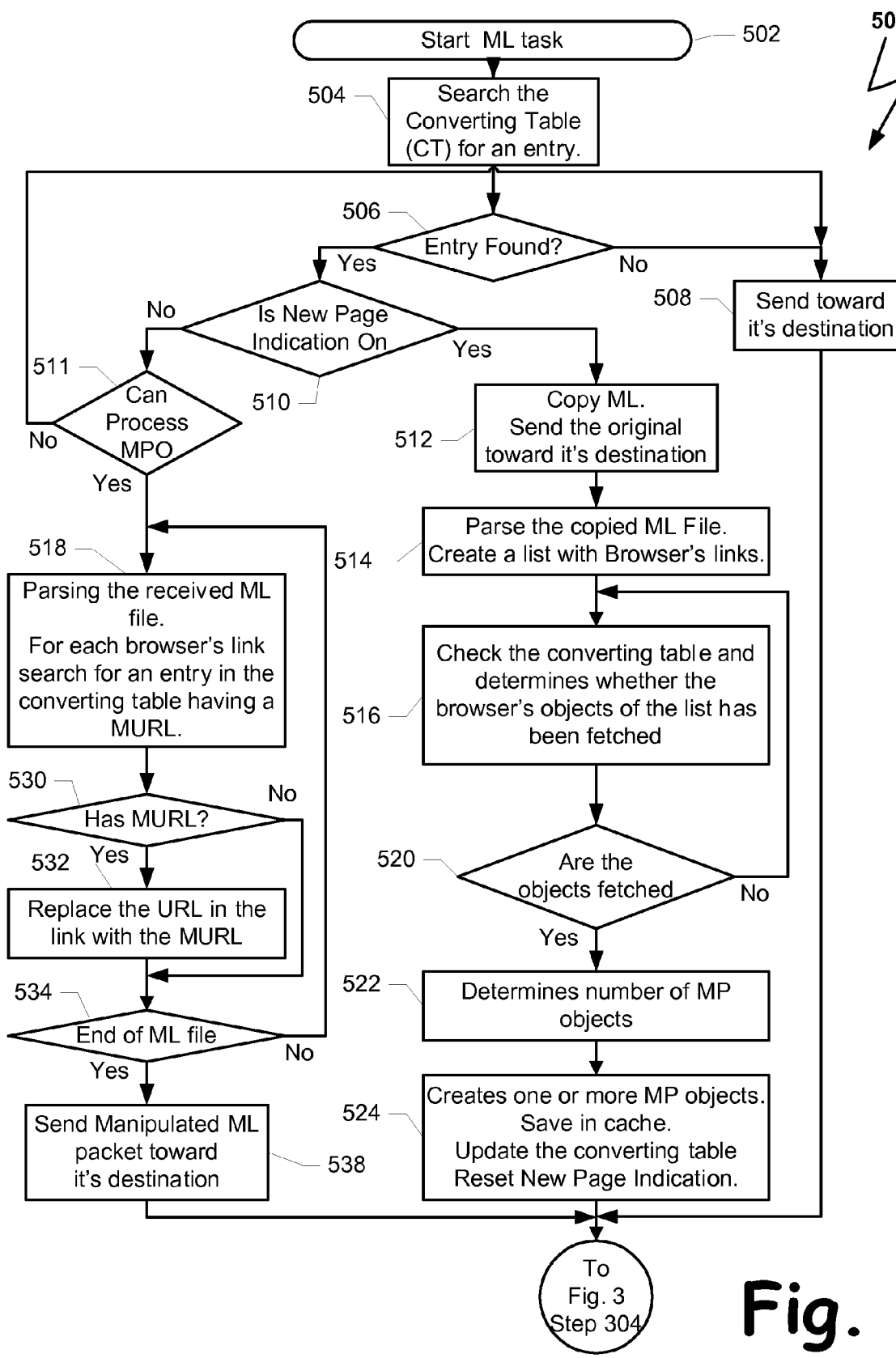
FIG. 5 illustrates a flowchart with relevant steps of an exemplary method that may be used for processing a ML file.

If the received data segment belongs to an ML file 308 the data segment is transferred to the MMM 256 (FIG. 2) 330 and processed by the ML Task 500 at step 502 of FIG. 5. If it is determined at step 308 that the packet is a responded object 340 that was received from one of the content servers 150 (FIG. 1) then the process 300 may proceed to step 342 for further processing of the responded object.

At step 342, the converting table is searched for an entry that is associated with the responded object. The search can be based on the URL from where the object was sent. The entry, if found in the converting table, was created earlier when a request (step 320) to this object was received from the user that is associated with the relevant UTSM 250 (FIG. 2). If an entry was not found 344, then process 300 proceeds to step 350 and the data segment is sent toward its final destination via HTTP proxy 230 (FIG. 2). If an entry was found 344, then the parsing of the data segments continues to determine if the object is a whether the object is a private object 345.

If the object is a private object 345, then the relevant entry that is associated with the URL of the object is deleted from the converting table, also the browser's links list is updated 348 by removing the relevant link from the list and process 300 continues at step 350 by sending the data segment toward its destination via the HTTP proxy. However, if the object is not a private object 345, then the object (which is a public object) is saved in the cache 346; the relevant entry in the converting table is updated with the type of the object, the location in the cache, and the expiration date; and the list of the browser's links is updated 346 by indicating the reception of the object. Process 300 continues at step 350 by sending the data segment toward its destination via the HTTP proxy 230 (FIG. 2).

When an object is carried by two or more packets, the step of saving the object in the cache 346 can be adapted to aggregate, in the cache 270 (FIG. 2), the received chunks of the object in order to reconstruct the object before adding it to a MPO.

Figure 4:
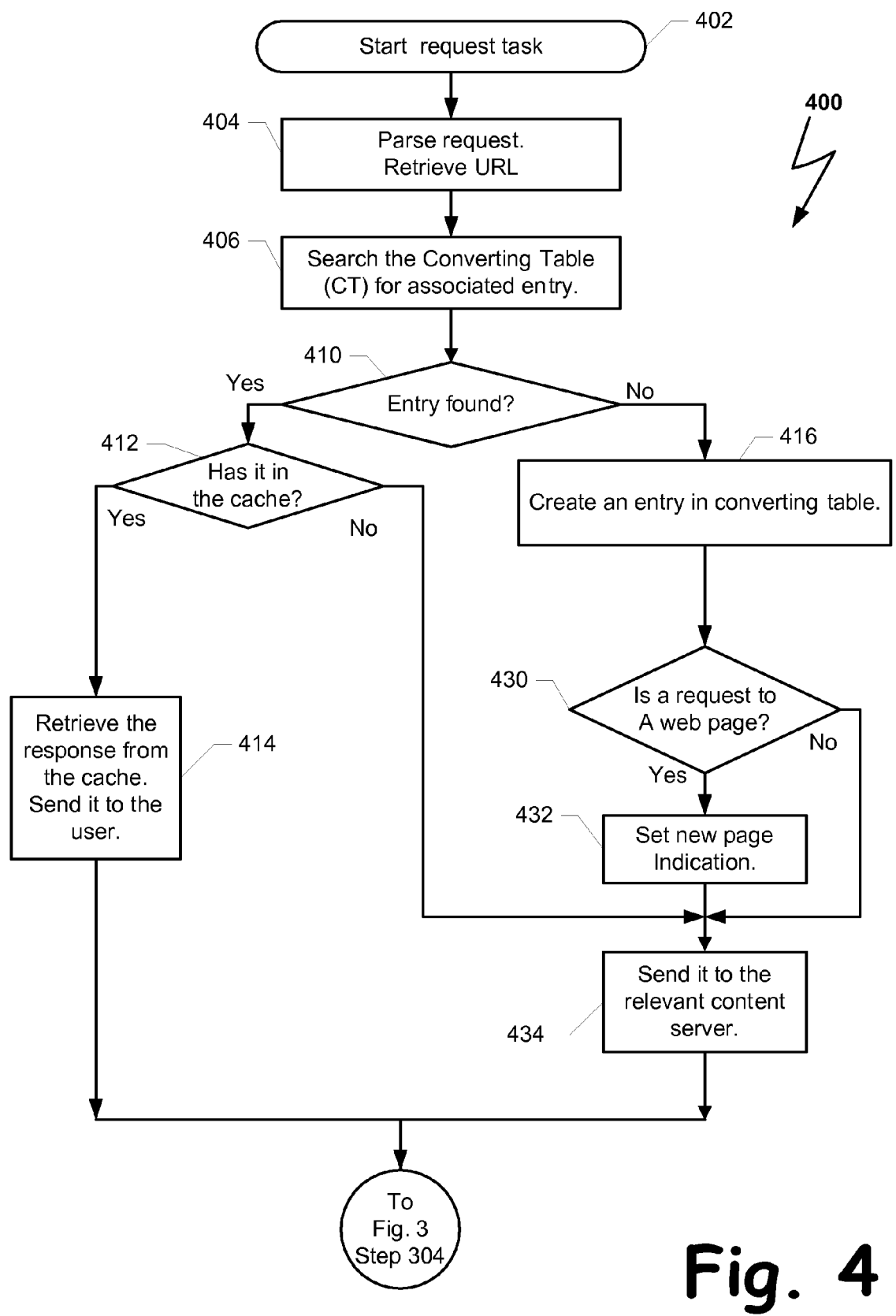
FIG. 4 illustrates a flowchart with relevant steps of an exemplary method that may be used for processing a request.

FIG. 4 illustrates a flowchart with relevant steps of an exemplary process 400 that can be used by UTSMM 252 (FIG. 2) for handling a user's request packet. In an alternate exemplary embodiment of the present invention, a requester module may be included in each UTSM 250 (FIG. 2). In such an embodiment of the present invention, the request task process 400 may be handled by the requester module. The request task process 400 may be initiated 402 by the UTSM process, upon identifying that a received packet is a request from the associated user (step 320 of FIG. 3). After initiation 402, the request task process 400 may parse the header of the packet in order to retrieve the destination URL of the packet 404. After retrieving the URL 404 the converting table can be searched 406 for an entry that is associated with the retrieved URL.

If an entry is found in the converting table 410, then the relevant field in the entry is retrieved to determine if 412 the requested object is in the cache 270 (FIG. 2). If the requested object is in the cache 412, the responded object is retrieved from the cache and is sent 414 toward the associated user 110 (FIG. 1) via HTTP proxy 230 (FIG. 2). The request task process 400 transfers the control to UTSM Manager Module task 300 at step 304. If the requested object is not in the cache 412 (the requested object is a private object, for example), then the request is sent as is 434 toward its destination, a content server 150 (FIG. 1), for example, via HTTP proxy 230 (FIG. 2). The request task 400 then transfers the control back to the UTSM Manager Module task 300 at step 304.

Returning to step 410, if it is determined that an entry was not found, then an entry is created 416 in the converting table and the URL that is associated with the request is written in the appropriate field in the new entry. The request task 400 may further process the received packet in order to determine whether the request is for an ML file.

If the request is not for a ML file (web page) 430, then the requested packet is sent as is via HTTP proxy 230 (FIG. 2) toward its destination 434, a content server 150 (FIG. 1), for example, and the request task 400 returns control back to the UTMS Manager Module task 300 at step 304. If the request is for a ML file 430, then a new ML file indication is set to indicate that the relevant entry in the converting table is associated with a new ML file 432. This indication can be used later for initiating a new page process. Then, the request is sent as is toward its destination 434, a content server 150 (FIG. 1), for example, via HTTP proxy 230 (FIG. 2) and the request task 400 returns control back to UTMS Manager Module task 300 at step 304.

FIG. 5 illustrates a flowchart with relevant steps of an exemplary ML task process 500 that can be used for handling a received packet that belongs to an ML file. The ML task 500 can be implemented by an exemplary ML file manipulator module (MMM) 256 (FIG. 2). The ML task 500 may be initiated or invoked 502 by the UTM Manager Module task 300 upon identifying that a received packet belongs to a requested ML file (web-page) 330. After initiation 502, the ML task 500 may retrieve the source URL of the packet. After retrieving the URL the converting table can be searched 504 for an entry that is associated with the retrieved URL. If an entry was not found 506, then the packet is sent as is 508 toward its destination, the associated user 110 (FIG. 1), for example, via HTTP proxy 230 (FIG. 2) and the ML task 500 returns control back to the UTSM Manager Module task 300 at step 304.

If an entry was found in the converting table 506, then the relevant field in the entry is retrieved to determine whether the web-page is a new page. If the web-page is not a new one (the new page indicator is off) 510, then a decision is made 511 as to whether the endpoint has a browser application that can process multipart objects. If the endpoint is not so equipped, then the ML packet is sent as is 508 toward the associated user via the HTTP proxy. If the user's browser can process MPOs 511, then the ML file is parsed 518 looking for the next browser's link. Upon reaching the next browser's link its URL is retrieved and the converting table is searched for an entry that is associated with the retrieved URL. If an entry is found, a decision is made 530 whether the entry includes a MURL. The MURL is a replacement URL of the browser's link. The MURL can reflect the location of the compound object in the cache 270 (FIG. 2) and the original URL of the browser's object. The compound object can be the MPO which comprises the object that is pointed by the browser's URL.

If a MURL does not exist in the relevant entry 530, which means that the object is not embedded within an MPO, then the browser's link is left as is and the ML task 500 continues at step 534.

If an MURL exists in the relevant entry 530, which means that the object is embedded within an MPO, then the browser's link is replaced with the relevant MURL 532 and the ML task 500 continues at step 534 and determines whether the end of the ML data segment was reached. The MURL can represent the location of the relevant MPO in the cache 270 as well as the original URL of the browser's object. An exemplary MURL may use Microsoft mhtml scheme. An exemplary MURL may look like mhtml:http://local_server/flashnetworks.mht!http://www.flashnetworks.com/images/1.gif.

At step 534 a decision is made whether the end of the ML data segment was reached. If the end of the ML data segment has not been reached 534, the ML task 500 returns to step 518 searching for the next browser's link in the ML data segment. If the end of the ML data segment has been reached 534, then the data segment with the Modified ML file is sent toward its destination 538, the associated user 110 (FIG. 1), via HTTP proxy 230 (FIG. 2) and the ML task 500 returns control back to the UTSM Manager Module task 300 at step 304. Before sending 538 the manipulated packet, additional processes may be taken in order to adapt the manipulated packet to the requirement of the communication protocols.

In an alternate exemplary embodiment of the present invention MMM 256 can be adapted to determine if a ML file is public and accordingly can store the relevant MML file in the cache. In such embodiment, a decision can be added between step 511 and 518. If 511 the browser can handle MPOs then a decision is made whether the relevant MML is stored in the cache. If not, MMM 256 may continue and execute steps 518 to 538 creating an updated MML. Step 538 can be adapted to store the updated MML in the cache. However, if the relevant MML file is stored in the cache, then the stored MML can be retrieved and MMM 256 can proceed directly to step 538 sending the retrieved MML file toward the destination.

Returning now to step 510, if the web-page is a new one, then the ML file is copied 512 into the shared memory 260 (FIG. 2) and the received packet is transferred as is toward its destination, the associated user 110, via the HTTP proxy 230 (FIG. 2). After sending the received packet, the copy of the ML packet is parsed 514, all the browser's links are copied to create a browser's link list. The list can be organized according to the order of the browser's links in the packet. After creating the list, a loop is entered that consists of checking the entries in the converting table that are associated with the browser's links in the list 516 in order to determine whether the browser's objects that are associated with the list have been fetched 520. If all the browser's objects have been fetched 520, the ML task 500 continues at step 522, otherwise processing returns to step 516. In one exemplary embodiment of the present invention, the duration of this loop comprising steps 516 and 520 may be limited, for example for few seconds to few minutes. If the duration expires, then method 500 may proceed to step 522 even without collecting the entire browser's links.

At step 522 the ML task 500 may determine the number of MPOs that will be associated with the new page. Different criteria can be used to define the number of MPOs. Exemplary criteria can include the expiration dates. For example, the objects can be organized according to their expiration dates and each MPO may comprise a group of objects that have expiration dates that are close to each other (i.e., within a threshold amount of time). Other criteria can be the size of the objects. Dividing the objects between the different MPOs according to their size helps to minimize the number of packets that carry objects of a web-page. Other criteria can be the order of appearance of the links of those objects in the ML file, etc.

After defining the number of MPOs and the objects that will be embedded in each one of the MPOs, the one or more MPOs can be created 524. An exemplary embodiment of the present invention may create the MPOs according to RFC 2557. Each MPO can be associated with an expiration date (the shortest expiration date among its objects, for example) and be stored in the cache 270. An entry in the converting table is allocated to the MPO. Then an MURL value is defined for each one of the objects that is included in the MPO. The MURL can reflect the location of the MPO in the cache 270 (FIG. 2) as well as the original URL of the object. Then the converting table is updated, each entry that is associated with an object, which is embedded within the MPO, is updated and the relevant MURL is stored in the appropriate field of each entry. At the end of this process, after handling all the MPOs that are associated with the new page, the new page indication, in the entry that is associated with the page, can be reset. The copy of the received new ML file in the shared memory can be deleted. Then the ML task 500 transfer the control back to the UTSM Manager Module task 300 at step 304.

In an alternate exemplary embodiment of the present invention an MPO may be created on-the-fly instead of being prepared and stored in the cache. In such embodiment the process 524 can be adapted to create a list of the public objects that compose an MPO. The list can be stored in the converting table in the entry that is associated to the relevant MURL. Upon receiving a request for an MPO based on its MURL the list of the objects can be retrieved and the MPO is created and be sent to the requester.

In an alternate exemplary embodiment of the present invention (not shown in the drawings) the some or all of the above-described processes may be implemented in a content server. Such an embodiment may work off-line on the web-pages that are stored in the content server. In this situation, there is no need for an HTTP proxy 230 (FIG. 2). The system can be initiated by a timer and start scanning the content of the server for new web-pages or for expired web-pages. Alternatively, or additionally, the system can be initiated before web-publication of a new content. The system can create an MML and two or more MPOs and store the MML and the one or more MPOs in the server. Then the content server is adapted to send the original ML file or the MML according to the type of the browser and its ability to handle the MPOs.

Overall, this invention improves the experience of a surfer while surfing the Internet, reduces the rendering time of a web-page and reduces the load between a plurality of surfers and a plurality of servers.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. It will be appreciated that the above described modules may be varied in many ways, including, changing the number modules, and combining two or more modules into one. Dividing the operation of a certain module into two or more separate modules, etc.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. An apparatus for shaping web-page traffic between a plurality of endpoints and a plurality of servers, wherein the apparatus is installed in an intermediate node between the plurality of endpoints and the plurality of servers and wherein the communication between the endpoints and the servers is based on the Internet Protocol (IP), the apparatus comprising:
   a converting table; and
   a plurality of User's Traffic Shaper Modules (UTSMs), wherein each UTSM is associated with an endpoint from the plurality of endpoints, which are currently communicating via the apparatus, and wherein each UTSM is adapted to:
   receive data traffic from/to the associated endpoint;
   analyze the received data for creating tracking information that is related to one or more requested ML files by (a) defining the type of data, (b) parsing a request for a new received ML file, (c) creating a list of browser's links that are embedded within the received new ML file, and (d) storing in the cache received objects that are associated with links from the list of browser's links;
   store, in the converting table, the tracking information related to one or more requested markup language (ML) files;
   modify a received ML file, targeted to an endpoint by replacing two or more browser's links, each browser link is replaced with a link pointing to a compound object and indicating a URL which represents the compound object and the original URL of the replaced browser's object, wherein each compound object includes two or more browser's objects that are referenced by browser's links in the received ML file; and send the modified ML file to the associated endpoint, wherein a browser's link is a link that is used automatically by a browser, at an endpoint, during parsing of the received ML file; and wherein a browser's object is an object that is fetched automatically by the browser.

2. The apparatus of claim 1, further comprising:

an HTTP proxy capable of transferring/receiving the data traffic to/from the plurality of UTSMs; and a cache capable of storing compound objects and/or browser's objects.

3. The apparatus of claim 1, wherein the compound object is a multipart object (MPO).

4. The apparatus of claim 3, wherein the MPO complies with RFC 2557.

5. The apparatus of claim 4, wherein each of the one or more links pointing to one or more MPOs is a multipart URL (MURL) that is implemented according to an mhtml scheme.

6. The apparatus of claim 3, wherein each one of the links that points to an MPO replaces a link to an object that is included in the MPO and each replacing link includes a Multipart URL (MURL) that represents the MPO and the URL that was replaced.

7. The apparatus of claim 6, wherein the compound object comprises public objects.

8. The apparatus of claim 2, further comprising a redirector that is installed in front of the HTTP proxy or as part of the HTTP proxy.

9. The apparatus of claim 1, wherein the UTSM is operable to modify the received ML file based on stored tracking information that was created while analyzing a previously received ML file from the same URL regardless to which user requested the previous received ML file.

10. The apparatus of claim 1, wherein the tracking information is related to ML files and browser's links and the type of information is selected from the group consisting of: type of object, source URL, location in the cache, classification of the object as private object or public object, location in the cache of a relevant compound object and expiration date.

11. A method for shaping web-page traffic between a plurality of endpoints and a plurality of servers, wherein the communication between the endpoints and the servers is based on Internet Protocol (IP), the method comprising the steps of:

a. receiving data traffic communicated between at least one endpoint of the plurality of endpoints and at least one server of the plurality of servers;

b. modifying a received ML file targeted to an endpoint by replacing two or more browser's links, each browser link is replaced with a link pointing to a compound object, each replacing browser's link pointing to a URL which represent the compound object and the original URL of the replaced browser's object, and sending the modified ML file to the targeted endpoint, wherein the compound object including the two or more browser's objects that are referenced by browser's link in the received ML file;

analyzing the received data to creating tracking information that is related to one or more requested ML files by (a) defining the type of data, (b) parsing a request for a new received ML file, (c) creating a list of browser's links that are embedded within the received new ML file, and (d) storing in the cache received objects that are associated with links from the list of browser's links; and storing the tracking information in a converting table.

12. The method of claim 11, wherein the compound object and/or the browser's object are stored in a cache.

13. The method of claim 11, wherein the step of modifying the received ML file further comprises creating a compound object that is a multipart object (MPO).

14. The method of claim 11, wherein step of modifying the received ML file further comprises creating a compound object that is a multipart object (MPO) that complies with RFC 2557.

15. The method of claim 11, wherein the step of modifying the received ML file further comprises creating a compound object that is a multipart object (MPO) wherein each one of the replacing links that points to the MPO includes a Multipart URL (MURL) that represents the MPO and the URL that was included in the replaced link.

16. The method of claim 11, wherein the replacing two or more browser's links are pointing to public objects.

17. The method of claim 11, further comprising the step of modifying the received ML file based on stored tracking information that was created while analyzing a previously received ML file from the same URL regardless of the destination of the previous received ML file.

18. The method of claim 11, further comprising the steps of:

e. creating one or more compound objects wherein each compound object includes two or more objects that are associated with links that belong to the list of browser's links f. storing the one or more compound objects in the cache;

g. storing in the converting table tracking information related to each one of the compound objects; and h. updating each entry in the converting table, which is associated with an object that is embedded within a compound object, to include a replacement URL that represents the location of the stored compound object and the original URL.

19. The method of claim 18, wherein the step of creating one or more compounds objects is based on a criteria selected from a group consisting of: size of each object, expiration date, and object type.

20. A method for shaping web-pages traffic from a web server to a plurality of endpoints, wherein the traffic is based on Internet Protocol (IP), the method comprising:

a. retrieving a markup language (ML) file from the web server;

b. analyzing the retrieved ML file for creating tracking information by defining the type of data, parsing a request for a new received ML file, creating a list of browser's links that are embedded within the received new ML file, and storing in the cache received objects that are associated with links from the list of browser's links;

c. storing the tracking information in a converting table;

d. modifying a retrieved ML file by replacing two or more browser's links, each link pointing to a URL having a browser's object, each browser's link is replaced with a link pointing to a compound object that is located in the web-server, wherein the compound object includes the two or more browser's object; and e. storing the modified ML file in the web-server.

21. The method of claim 20, wherein the step of modifying a retrieved ML file comprises replacing the browser's links with a link that points to a compound object that is a multipart object (MPO).

22. The method of claim 20, wherein the step of modifying a retrieved ML file comprises replacing the browser's links with a link that points to a compound object that is a multipart object (MPO) and wherein the MPO complies with RFC 2557.

23. The method of claim 20, wherein the step of modifying a retrieved ML file comprises replacing the browser's links with a link that points to a compound object that is a multipart object (MPO) and wherein each one of the replacing links that point the MPO includes a Multipart URL (MURL) that represents the MPO and the URL that was included in the replaced link.

24. The method of claim 23, wherein the MURL is implemented according to mhtml scheme.

25. The method of claim 21, wherein the step of modifying a retrieved ML file comprises replacing the browser's links with a link that points to a compound object that is a multipart object (MPO) and wherein the replaced links point a public object.

26. The method of claim 17, wherein the step of analyzing further comprises the steps of:
- f. parsing the retrieved ML file;
- g. creating a list of browser's links that are embedded within the retrieved ML file;
- h. defining the number of MPO to be used and the objects that will be embedded within each MPO;
- i. retrieving the browser's object from the web-server and creating the one or more MPOs; and
- j. storing the MPOs in the web-server.

\* \* \* \* \*